DAVID W. LIPKE
INVENTOR

BY

[signatures]
ATTORNEYS 3,450,842

DOPPLER FREQUENCY SPREAD CORRECTION DEVICE FOR MULTIPLEX TRANSMISSIONS

David W. Lipke, Bethesda, Md., assignor to the United States of America as represented by the Administrator of the National Aeronautics and Space Administration
Filed Oct. 22, 1965, Ser. No. 502,753
Int. Cl. H04j *1/00;* H04l *5/00;* H04b *1/40*
U.S. Cl. 179—15 12 Claims

ABSTRACT OF THE DISCLOSURE

A device for automatic correction of the baseband Doppler spread encountered in communication systems designed for multiplex transmissions is described. Multiplex equipment receives incoming signals and "stacks" them one atop the other in frequency so that the output frequency spectrum extends to XN kilocycles per second where X=the bandwidth of each channel and N=the number of input channels. The device makes use of the method employed in the multiplex equipment for generating translation frequencies. In essence, it replaces the oscillator with a signal which has Doppler information. This signal is derived from pilot tones or frequencies. The new signal is equal in frequency to that of the replaced oscillator plus or minus the Doppler on the oscillator frequency, i.e., the one-way Doppler that the oscillator frequency would experience if it were transmitted to a moving vehicle. All harmonics will have corresponding multiples of the required Doppler spread correction and as a result, the Doppler spread will be compensated incrementally in X kilocycles per second steps across the baseband.

Figure 1:
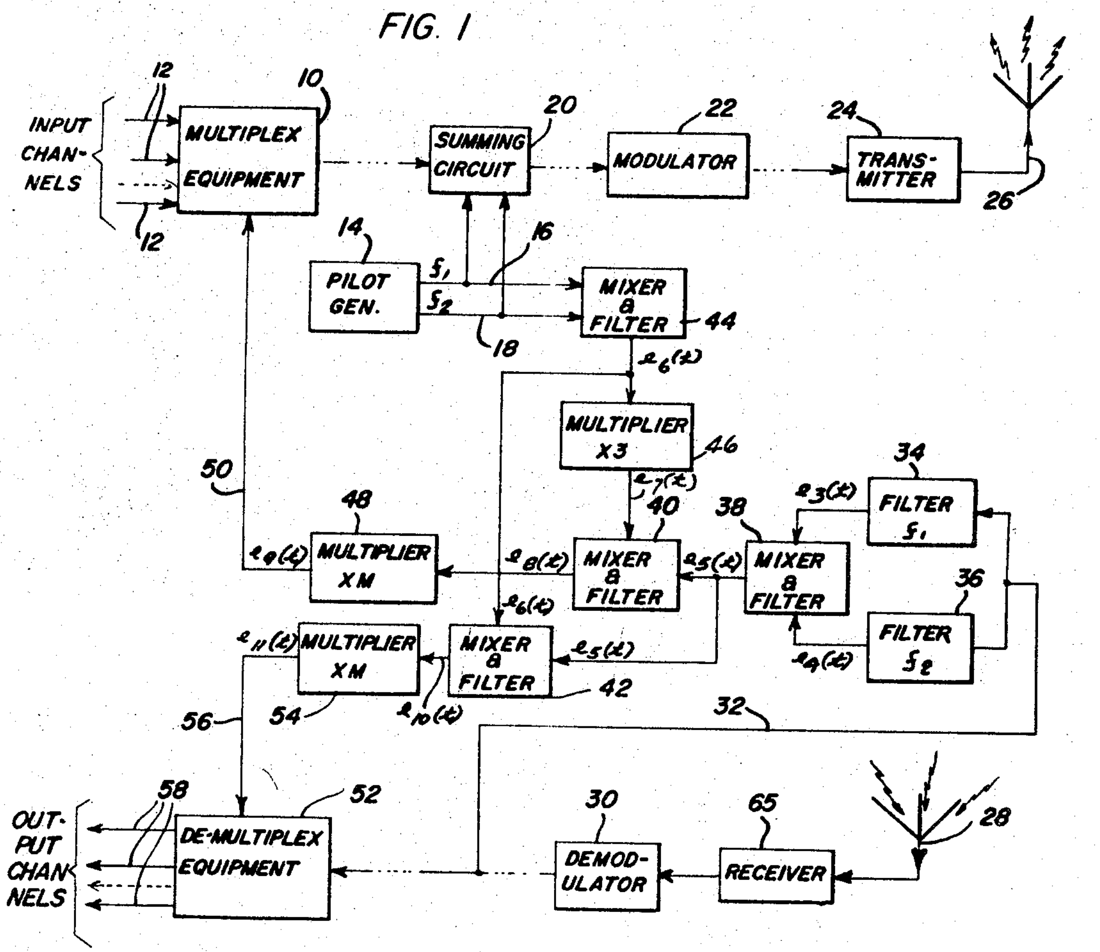

The invention described herein may be manufactured and used by or for the Government of the United States of America for governmental purposes without the payment of any royalties thereon or therefor.

This invention relates to a method and apparatus for correcting for Doppler effects in communication systems and more specifically to the automatic correction of the baseband Doppler spread encountered in communication systems designed for frequency division multiplex transmissions. The invention may be employed with any form of amplitude or angle modulation.

Prior to the advent of communication between two stations rapidly moving with respect to each other, the change in frequency (Doppler principle) in the communication was little more than an interesting phenomenon to observe. Such a change occurs in the pitch of the whistle of a train as the train passes the observer. This observation illustrates a principle applicable to all wave motion that was developed more than a century ago by an Austrian physicist Christian Doppler. Thus, it has been known for some time that the frequency of a transmission will differ from the frequency of the source when the source and receiver are moving with respect to each other. This difference is quite marked even when the velocity of motion is less than 1% of the transmission.

With the introduction of high speed vehicles and the necessity of communication to and from these vehicles, frequency shifts in the transmission to and from these vehicles have been given added importance and means and apparatus have been introduced to compensate for these frequency shifts. In any communication system, the goal, rarely achieved, is to faithfully reproduce, without error, the transmission at the receiver so that the communication at the transmitter and the receiver are in perfect agreement.

As noted, transmissions to and from a vehicle which is moving relative to a fixed station will undergo Doppler frequency shifts. The term "vehicle" is used herein to denote any moving object such as a satellite, aircraft, etc. which receives and detects or receives and relays a radio transmission. The Doppler shift of the carrier frequency is relatively unimportant to angular modulations (phase and frequency modulations) and can be readily corrected for amplitude modulations (single sideband and double sideband). In addition to the carrier Doppler shift, there is a Doppler shift spread across the baseband signal which results from different Doppler shifts on individual frequency components. It is easily shown that this Doppler shift spread exists for all forms of angle and amplitude modulation.

One of the known prior systems for compensating for Doppler effects was manual in that during the transmission, the frequency of an oscillator could be manually varied so as to compensate to some degree for the Doppler shift. Other systems are known in other types of communication systems wherein some frequency shift compensation is effected. However, no systems are known wherein the system will automatically compensate or correct the baseband Doppler spread encountered in frequency division multiplex transmissions. The present invention corrects the Doppler spread on the fixed station-to-vehicle link by changing the reference frequency of the transmitter multiplex equipment by an amount proportional to the Doppler spread. The multiplex equipment uses a single oscillator from which all translation frequencies are derived so that the correction will be applied across the entire baseband at each of the translation frequencies. For a positive Doppler shift, a negative correction is inserted in the multiplex equipment and for a negative Doppler shift, a positive correction is inserted in the multiplex equipment. A similar reference frequency is used for the receiver de-multiplex equipment to correct for the Dopper spread on the vehicle-to-fixed station link.

Accordingly, it is the principal object of the present invention to improve the fidelity of communication systems.

It is a further object of the present invention to improve communication systems of the frequency division multiplex type.

It is a further object of the present invention to provide a method and apparatus for automatically correcting the baseband Doppler spread encountered in frequency division multiplex communication systems.

It is a further object of the present invention to provide a method and apparatus for automatically correcting the baseband Doppler spread encountered in frequency division multiplex communication systems which is dynamic in principle in that the system will accommodate different changes in the frequency or different Doppler spreads of the transmission.

It is a still further object of the present invention to provide a method and apparatus for automatically correcting for Doppler effects in frequency division multiplex communication systems by employing a pair of pilot frequencies which are transmitted and received and utilized to determine the amount of corrective action that must be taken to compensate for the Doppler shift.

These and other objects of the present invention are accomplished as set forth in the following description and illustrations. The system described in the present invention may be used with conventional multiplex equipment or equipment which operates similarly in principle. Multiplex equipment accepts incoming signals (voice, teletype, facsimile, etc.) which occupy a band width of a predetermined number of cycles (for example 4 kilocycles per second and a voice channel may require 3.1 kilocycles per second) and "stacks" the input channels one atop the other in frequency so that the output frequency spectrum extends to 4N kilocycles per second where N is the number of input channels. The mechanism for generating the frequencies needed to shift each input signal or channel to its proper frequency location employs a single oscillator. The oscillator is employed in a circuit which generates a base frequency, for example, of 4 kilocycles per second. Harmonics of the 4 kilocycles per second signal are then used to derive the translation frequencies for the successive channels.

The present invention makes use of the method employed in the multiplex equipment for generating the translation frequencies. In essence, the apparatus replaces the oscillator wtih a signal which has Doppler information. This signal is derived from pilot tones or frequencies to be hereinafter described. The new signal is equal in frequency to that of the replaced oscillator (oscillator frequency=$f$) plus or minus the Doppler on $f$, i.e., the one-way Doppler shift that $f$ would experience if it were transmitted to the moving vehicle. Using the new signal, the base frequency is now the base frequency plus or minus the Doppler on that frequency. For example, if the base frequency is 4 kilocycles per second, the new base frequency would be 4 kilocycles per second plus or minus the Doppler shift on the 4 kilocycles per second. The plus or minus sign is determined by the sense of the correction required, i.e., whether the vehicle is moving away from or toward the fixed station. All harmonics will have corresponding multiples of the required Doppler spread correction and, therefore, the Doppler spread will be compensated incrementally in 4 kilocycles per second steps across the baseband.

Figure 2:
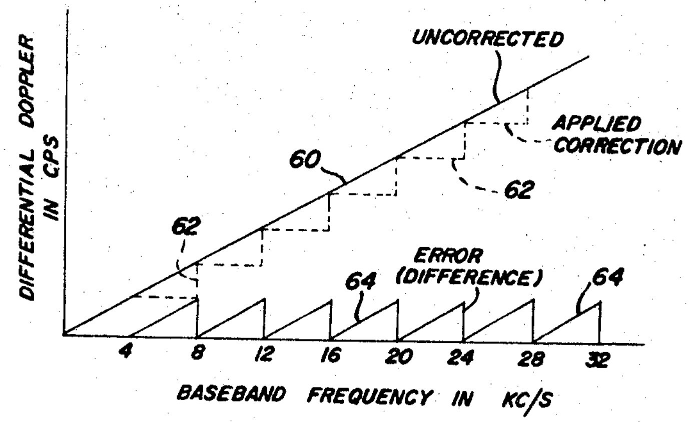

The invention both as to its organization and method of operation together with further objects and advantages thereof will best be understood by reference to the following specification taken in conjunction with the accompanying drawings, in which:

FIGURE 1 is a block diagram of the invention and illustrating a transmitter, a receiver, and the apparatus for interrogating the received signal for determining the Doppler correction; and FIGURE 2 is a graph of the Doppler shift versus baseband frequency and illustrating the effect of the correction applied across the baseband.

With reference to the FIGURE 1, a conventional multiplex apparatus or equipment 10 has applied thereto a plurality of input channels 12. The multiplex equipment 10 accepts the incoming signals on the input channels 12 and "stacks" the information one atop the other in frequency. Harmonics of a base frequency signal (4 kc./s.) are used to derive the translation frequencies for stacking. The base frequency is derived from a reference frequency (typically 100 kc./s.). Typical baseband arrangements for voice channels can be found in the documents of the International Telegraph and Telephone Consultative Committee (CCITT, II$^{nd}$ Plenary Assembly, New Delhi, Dec. 8–16, 1960, Red Book, vol. III).

A pilot generator 14 generates a first frequency $f_1$ on a conductor 16 and a second frequency $f_2$ on a conductor 18. The frequencies $f_1$ and $f_2$ are known as pilot frequencies and are generated in the pilot generator 14 by a single stable local oscillator. The pilot frequencies $f_1$ and $f_2$ may be located above or below the multiplex output signal or may be located between channels in the multiplex output. As an example, if the multiplex output extends from 0.316 mc./s. to 5.56 mc./s., the pilot frequency $f_1$ could be chosen to be 250 kc./s. and the pilot frequency $f_2$ could be chosen to be 300 kc./s. The two pilot frequencies $f_1$ and $f_2$ on the conductors 16 and 18, respectively, are added to the output from the multiplex equipment 10 in a summing circuit 20. The output from the multiplex equipment 10 to the summing circuit 20 is joined by a broken line which indicates that other electronic functions such as amplification, wave shaping, etc.

may be performed between the equipment 10 and the summing circuit 20. After further electronic functions are performed, the output of the summing circuit 20 is directed to a modulator 22 which generates a carrier frequency. In typical systems, the composite signal from the summing circuit 20 would modulate a carrier and the modulated signal would then be translated in frequency to the fixed terminal-to-vehicle carrier frequency. Thereafter, the signal is transmitted by a transmitter 24 to a vehicle via an antenna 26.

The signal transmitted from the vehicle is received at the fixed station by an antenna 28 and a receiver 65 and demodulated by a demodulator 30. After demodulation by the demodulator 30, the signals are applied via a conductor 32 to an $f_1$ filter 34 and to an $f_2$ filter 36 tuned, respectively, to these frequencies. The output from the filter 34 may be subtracted from the output of the filter 36 at a mixer and filter circuit 38. The output from the mixer and filter circuit 38 is applied to a mixer and filter circuit 40 and also to a second mixer and filter circuit 42.

The un-transmitted pilot frequency $f_1$ is subtracted from the un-transmitted pilot frequency $f_2$ by a mixer and filter circuit 44 whose output is applied to the mixer and filter circuit 42 as well as to a multiplier circuit 46. The multiplier circuit 46 multiplies the difference frequency derived from the mixer and filter 44 by three and directs its output to the mixer and filter circuit 40. The output from the mixer and filter circuit 40 is directed to a multiplier circuit 48 which multiplies the correction by a value "M" which is chosen to fit system parameters. As an example, if $f_2-f_1$ equal 50 kc./s. and the multiplex reference frequency is 100 kc./s., then the value of "M" would be one.

It will be noted that the output of the mixer and filter circuit 40 will be affected by the incoming signal on the mixer and filter circuit 38 which is supplied through a group of circuits commencing with an antenna 28. The transmitting portion and the receiving portion (all of which is shown in the FIGURE 1) are located at the same ground station. The signal is transmitted from the antenna 26, looped through a transceiver (not shown) in a space vehicle (not shown) and received on the antenna 28.

The output of the multiplier circuit 48 on a conductor 50 is the Doppler shift frequency experienced during the transmission and is applied to the multiplex equipment 10 as the new multiplex reference frequency to be utilized which now corrects for the effects of Doppler shifts.

For the de-multiplex equipment 52, the output of the mixer and filter circuit 42 is multiplied by a multiplier circuit 54 by a value of "M" and applied via a conductor 56 to the de-multiplex equipment 52. The outputs from the de-multiplex equipment 52 is obtained on a plurality of output channels 58.

The mathematical expressions illustrating the form of the wave from the various output circuits will now be illustrated. In arriving at the expressions, it will be assumed that the Doppler shifts of the carriers have been removed and that the second order Doppler effects are negligible.

At the filter circuit 34, the Doppler shifted pilot frequency $f_1$ is filtered by a narrow band filter 34 whose output is $$e_3(t)=E_3 \cos [(W_1\pm 2W_{1D}\pm W_{ED})t+\theta_1+\theta_E]$$

where:

$E_3$=voltage amplitude
$W_1=2\pi f_1$=radian frequency of pilot
$W_{1D}=W_1 v/c$=radian frequency Doppler shift of pilot
$W_{ED}$=Doppler shifted error radian frequency introduced anywhere in the system
$\theta_1$=initial phase of pilot frequency
$\theta_E$=any phase error introduced in the system.

The radian frequency of the Doppler shifted pilot is $$W_1\left(1\pm\frac{v}{c}\right)=W_1\pm W_{1D}$$

where $v$=the velocity of the vehicle relative to the fixed station and $c$=the velocity of light. The term $2W_{1D}$ arises from the fact that the Doppler spread is independent of the carrier frequency.

Similarly, the second pilot frequency $f_2$ is filtered by the narrow band filter 36 whose output is $$e_4(t)=E_4 \cos [(W_2\pm 2W_{2D}\pm W_{ED})t+\theta_2+\theta_E]$$

Phase and frequency errors in the system are assumed to act the same on both the pilot frequencies $f_1$ and $f_2$. It is noted that the notation for $e_4(t)$ is similar to that for $e_3(t)$.

The signal $e_3(t)$ is subtracted from $e_4(t)$ in the mixer and filter circuit 38 whose output is $$e_5(t)=E_5 \cos \{[(W_2-W_1)\pm 2(W_{2D}-W_{1D})]t+(\theta_2-\theta_1)\}$$

where $E_5$=voltage amplitude. All frequency and phase errors are subtracted at this point.

The un-transmitted pilot frequency $f_1$ is subtracted from the un-transmitted pilot frequency $f_2$ in the mixer and filter circuit 44 whose output is $$e_6(t)=E_6 \cos [(W_2-W_1)t+(\theta_2-\theta_1)]$$

where $E_6$ equals voltage amplitude. This frequency difference is then multiplied by a factor of three in the multiplier circuit 46 whose output is $$e_7(t)=E_7 \cos [3(W_2-W_1)t+3(\theta_2-\theta_1)]$$

where $E_7$=voltage amplitude.

The signal $e_5(t)$ is now subtracted from $e_7(t)$ in the mixer and filter circuit 40 to yield $$e_8(t)=E_8 \cos \{[2(W_2-W_1) \mp 2(W_{2D}-W_{1D})]t+2(\theta_2-\theta_1)\}$$

where $E_8$=voltage amplitude. The frequency of this signal is then multiplied by a factor M and the multiplier circuit 48 whose output is $$e_9(t)=E_9 \cos 2M\{[(W_2-W_1)\mp(W_{2D}-W_{1D})]t+\theta\}$$

where $E_9$=voltage amplitude and $\theta=\theta_2-\theta_1$=a constant. This signal is employed as the reference frequency for the multiplex equipment on the conductor 50. The value of the multiplier "M" in the multiplier circuit 48 is chosen to fit the system parameters, as previously set forth.

The reference for the de-multiplex equipment 52 is derived from the mixer and filter 42 whose output is $$e_{10}(t)=E_{10} \cos \{[2(W_2-W_1) \pm 2(W_{2D}-W_{1D})]t+2(\theta_2-\theta_1)\}$$

and applied to the multiplier circuit 54 where $e_{10}(t)$ is multiplied by "M" whose output is $$e_{11}(t)=E_{11} \cos 2M\{[(W_2-W_1)\pm(W_{2D}-W_{1D})]t+\theta\}$$

on the conductor 56 and applied to the de-multiplex equipment 52.

The apparatus of the present invention corrects the Doppler spread on the fixed terminal-to-vehicle and vehicle-to-fixed terminal links independently. This is necessary in order to gain the maximum benefit of the invention since different fixed terminals which simultaneuosly use the same vehicle can have different Doppler spreads at any given time. The invention imposes no severe constraints on any signal processing in the vehicle.

With reference to the FIGURE 2, the function and advantage of the invention is illustrated in graphic form. With the baseband frequency shown as the abscissa and the differential Doppler frequency as the ordinant, the curve 60 (substantially a straight line) indicates the Doppler effect for an uncorrected transmission. However, for a base frequency of 4 kilocycles per second and each succeeding harmonic frequency employed in the multiplex transmission, the correction is applied incrementally in steps to each channel as indicated at 62. The result is that the error is now minimized and indicated at 64. The error signal 64 which is the difference between the actual spread encountered in a transmission and the compensating signal, is now the differential Doppler in a 4 kilocycle per second channel rather than the uncorrected error indicated at the curve 60 that is across the entire baseband. For practical cases, the error 64 is negligible.

Thus, there has been described and illustrated a method and apparatus which will automatically correct the baseband Doppler spread encountered in communication systems designed for frequency division multiplex transmissions. The invention can be employed with any form of amplitude or angle modulation. The Doppler shift of the carrier frequency is relatively unimportant to angle modulations and can be easily corrected for amplitude modulations. In addition to the carrier Doppler shift, there is a Doppler spread across the baseband signal which results from different Doppler shifts on individual frequency components. It can be shown that this Doppler spread exists for all forms of angle and amplitude modulation.

The apparatus of the present invention corrects the Doppler spread on the fixed station-to-vehicle link by changing the reference frequency of the transmitter multiplex equipment by an amount proportional to the Doppler spread. The multiplex equipment uses a single oscillator from which all translation frequencies are derived so that the correction will be applied across the baseband at each of the translation frequencies. For a positive Doppler shift, a negative correction is inserted in the multiplex equipment and vice versa. A similar reference frequency is employed for the receiver demultiplex equipment to correct for the Doppler spread on the vehicle-to-fixed station link.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Apparatus for correcting Doppler affected frequency division multiplex signals including pilot signals of a first frequency and a second frequency for application to de-multiplex equipment which employs baseband translation frequencies comprising means for separating the received Doppler affected pilot signals from the multiplex signals including a first filter for passing said first frequency and a second filter for passing said second frequency, means for comparing the separated received Doppler affected pilot signals with un-transmitter pilot signals to derive a correction frequency, said means for comparing including mixer and filter circuits for deriving a difference signal from said first frequency and said second frequency for comparison with said un-transmitted pilot signals difference to yield said correction frequency, and means for applying the correction frequency to the de-multiplex equipment to correct the translation frequencies and thereby compensate for Doppler effects of the frequency division multiplex signals.

2. Apparatus for correcting Doppler affected frequency division multiplex signals including pilot signals for application to de-multiplex equipment which employs baseband translation frequencies comprising means for separating the received Doppler affected pilot signals from the multiplex signals, means for comparing the separated received Doppler affected pilot signals with un-transmitted pilot signals to derive a correction frequency, and means for applying the correction frequency, and means for applying the correction frequency to the de-multiplex equipment including a multiplier coupled to receive the correction frequency and to form a product frequency to be applied to said de-multiplex equipment to correct the translation frequencies and thereby compensate for Doppler effects of the frequency division multiplex signals.

3. Apparatus or correcting Doppler affected frequency division multiplex signals including a pair of pilot frequencies received therewith for application to de-multiplex equipment which includes means for generating channel translation frequencies comprising means for separating the received Doppler affected pilot frequencies from a distant station to derive a difference signal, means or comparing the difference signal with un-transmitted pilot signals difference to derive a correction frequency, and means for applying the correction frequency to the means for generating channel translation frequencies of the de-multiplex equipment to compensate for Doppler effects of the received multiplex signals.

4. Apparatus for correcting received Doppler affected frequency division multiplex signals from a distant station including a first pilot frequency and a second pilot frequency received therewith for application to de-multiplex equipment which includes means for generating channel translation frequencies comprising means for demodulating the received signals, a first filter responsive to said Doppler affected first pilot frequency, a second filter responsive to said Doppler affected second pilot frequency, a first mixer and filter circuit coupled to the outputs of said first and second filters to derive a difference signal, a second mixer and filter circuit for comparing said difference signal with the difference signal of the un-transmitted first and second pilot frequencies to derive a correction frequency, and means for applying said correction frequency to the means for generating translation frequencies of the de-multiplex equipment to compensate for Doppler effects of the received multiplex signals.

5. Apparatus for compensating for Doppler affected frequency division multiplex signals received from a distant station comprising multiplex equipment for receiving information over a plurality of input channels and forming an output, said multiplex equipment including means for generating translation frequencies, means for generating a pair of pilot frequencies, means for summing the output of said multiplex equipment with said pilot frequencies, means for transmitting the signals so summed, means for receiving from the distant station Doppler affected frequency division multiplex signals including the pilot frequencies, means for deriving from said received Doppler affected pilot frequencies a difference frequency, means for deriving a difference frequency from the untransmitted pilot frequencies, means for comparing both of said difference frequencies to derive a first correction frequency for application to de-multiplex equipment, and means for comparing both of said difference signals to derive a second correction frequency for application to said means for generating translation frequencies of said multiplex equipment.

6. The apparatus as defined in claim 5 wherein said means for deriving a difference frequency from said received Doppler affected pilot frequencies includes a pair of filters each responsive to a pilot frequency and a mixer filter coupled to the output of said pair of filters.

7. The apparatus as defined in claim 5 wherein said means for comparing both of said difference frequencies to derive a first correction frequency is a mixer-filter.

8. The apparatus as defined in claim 5 wherein said means for comparing both of said difference frequencies to derive a second correction frequency includes a multiplier for multiplying the un-transmitted pilot frequency difference by three to form a product which is then compared in a mixer-filter to said difference frequency of the received Doppler affected pilot frequencies.

9. A method of compensating for Doppler affected transmission in frequency division multiplex transmission employing an oscillator for deriving translation frequencies, which comprises receiving a Doppler affected transmission along with a pair of Doppler affected pilot frequencies, deriving from the received Doppler affected pilot frequencies a difference frequency, comparing the difference frequency to the difference frequency of un-transmitted pilot frequencies to derive a correction signal and applying the correction signal to the oscillator to affect the translation frequencies in the multiplex equipment and thereby correct the received Doppler affected transmission.

10. A method of compensating for Doppler affected transmissions in frequency division multiplex transmission employing translation frequencies which comprises generating a pair of pilot frequencies, summing the pilot frequencies with the multiplex transmission to be transmitted, transmitting the frequencies and transmission so summed, receiving a re-transmitted transmission including pilot frequencies which are Doppler affected, deriving from the received Doppler affected pilot frequencies a difference frequency, comparing the difference frequency to the difference frequency of un-transmitted pilot frequencies to derive a pair of correction signals, and applying one of the correction signals to alter the translation frequency of the multiplex equipment and the other correction signal to alter the translation frequency of the de-multiplex equipment to compensate for Doppler frequency shifts.

11. The method as defined in claim 10 wherein the step of deriving a difference frequency is by filtering and mixing the signals so filtered.

12. The method as defined in claim 10 wherein the step of comparing to derive a correction signal to multiplex equipment includes multiplying the difference frequency of un-transmitted pilot frequencies by three.

References Cited

UNITED STATES PATENTS

| | | | |
|---|---|---|---|
| 3,363,180 | 1/1968 | Geissler | 325—4 |
| 3,370,235 | 2/1968 | Miyagi | 325—4 |
| 3,364,311 | 1/1968 | Webb | 179—15 |

ROBERT L. GRIFFIN, *Primary Examiner.*

R. L. RICHARDSON, *Assistant Examiner.*

U.S. Cl. X.R.

325—4, 17; 343—176